United States Patent [19]
Lin

[11] Patent Number: 5,363,745
[45] Date of Patent: Nov. 15, 1994

[54] BEVERAGE VESSEL WITH MAGNETIC LID

[76] Inventor: Hsiang-Cheng Lin, No. 42, Yung-Chih St. Ying-Ko Chen, Taipei Hsien, Taiwan, Prov. of China

[21] Appl. No.: 159,474

[22] Filed: Nov. 30, 1993

[51] Int. Cl.⁵ ............................................. A47J 31/10
[52] U.S. Cl. ...................................... 99/306; 99/317; 220/230; 220/408; 220/763
[58] Field of Search .................. 99/306, 279, 284, 291, 99/295, 296, 298, 300, 301, 304, 307, 316, 317, 321, 322; 426/433; 220/230, 756, 762, 763, 761, 408

[56] References Cited

U.S. PATENT DOCUMENTS

| | | | |
|---|---|---|---|
| 1,980,715 | 11/1934 | Brosler | 220/408 |
| 3,334,574 | 8/1967 | Douglas | 99/304 |
| 3,961,721 | 6/1976 | Gordon et al. | 220/230 |
| 4,520,716 | 6/1985 | Hayes | 99/306 |
| 4,832,845 | 5/1989 | Hendretti | 99/306 |
| 4,977,820 | 12/1990 | Lin | 99/306 |
| 5,125,327 | 6/1992 | Winnington | 99/306 |

*Primary Examiner*—Robert W. Jenkins
*Attorney, Agent, or Firm*—Jacobson, Price, Holman & Stern

[57] ABSTRACT

A teapot or other beverage vessel has an internal rim at the top supporting a filter cup which grips onto the rim. A magnetic lid fits onto the rim of the filter cup. Tea leaves and other particles are thus confined within the filter cup and the lid is held magnetically in place.

8 Claims, 7 Drawing Sheets

BEVERAGE VESSEL WITH MAGNETIC LID

BACKGROUND OF THE INVENTION

This invention relates to beverage vessels such as teapots and particularly to teapot lid assemblies. A conventionally-designed teapot lid having a flanged bottom which is laid in the mouth of a teapot, is apt to fall off and break when the teapot is tilted for pouring tea. Apart from this problem, a teapot tends to allow tea dregs to flow out with the tea into a cup, or allows tea leaves to stick in the spout because there is nothing inside the teapot to stop the leaves or dregs from mixing with the tea. In consideration of the safe use of a teapot and the guaranteed quality of tea poured into a cup, the teapot should be provided with a tightly fixed lid and an internal filter.

SUMMARY OF THE INVENTION

This invention is designed to meet the above requirements and includes a bearing ring fixed inside the rim of the teapot mouth, a plate or a bar spring for a filter cup and a magnetic ring fixed inside the rim of the lid so that the filter cup can be held in the body of the teapot by means of the plate or the bar spring and the lid can adhere to the filter cup by means of the magnetic ring. This arrangement ensures tight fixation of the lid even when the teapot is tilted and the arrangement also provides effective filtration of the tea.

For a better understanding of the structure of the invention and its functions, further explanation is given below with reference to the attached drawings.

BRIEF DESCRIPTION OF THE DRAWINGS

FIG. 1A is a sectional view of the teapot lid.

DESCRIPTION OF PREFERRED EMBODIMENTS

Figure 1:
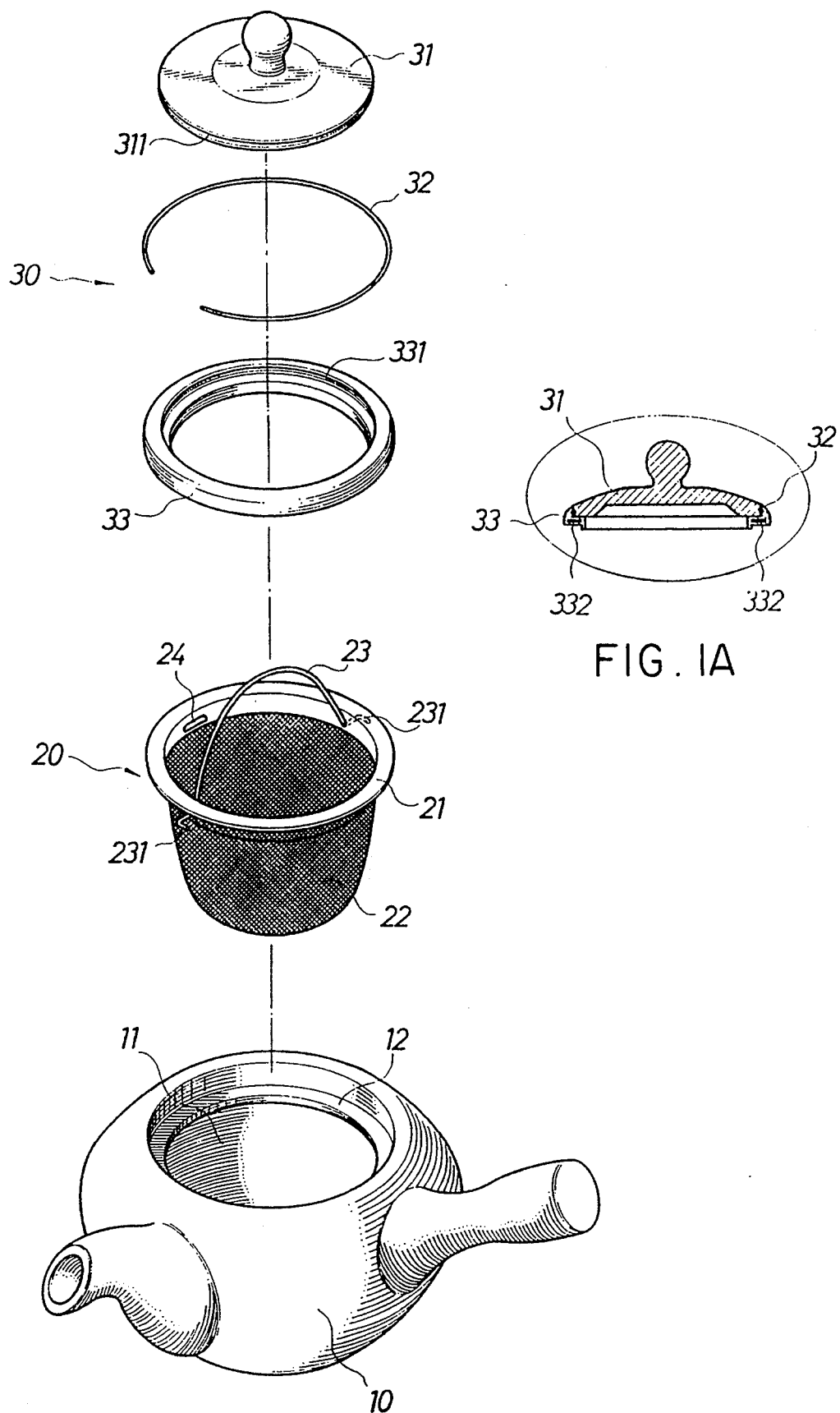
FIG. 1 is an exploded perspective view of a teapot structure showing the invention.

As shown in FIG. 1, the invention comprises a pot (10), a filter cup (20) and a lid (30), for which a bearing ring (12) is provided around the inside rim of the top mouth (11) of the pot (10). The filter cup (20) is made of a cup-shaped filter (22) topped by a magnetic metal rim (21). In the rim (21) are oppositely disposed side holes through which the two bent ends of an arc-shaped bar spring (23) pass and leave two outwardly protruding parts (231) bent horizontally. On one side of the cup rim (21) is an open slot (24) to hold the top of bar spring (23) when it is horizontal. The teapot lid (30) is composed of a lid body (31), a spring ring (32) and a lid ring (33). An annular groove (311) is provided around the rim of the lid body (31). The spring ring (32) has an opening and the ABS lid ring (33) has an annular groove (311) around its inside rim. A magnetic ring (332) is embedded in ring (33). As shown in FIG. 1A, the teapot lid (30) is assembled according to the following sequence: the spring ring (32) is first inserted into the annular groove (311) of the lid body (31) and this assembly is then inserted into the lid ring (33). The spring ring (32) is inserted into the groove (331) and thereby forms a lock between the lid body (31) and the lid ring (33) to tightly hold the lid ring (33) in the rim of the teapot lid. The outside diameter of the teapot lid (30) is somewhat smaller than the inside diameter of the top mouth (11) of the pot (10).

Figure 2:
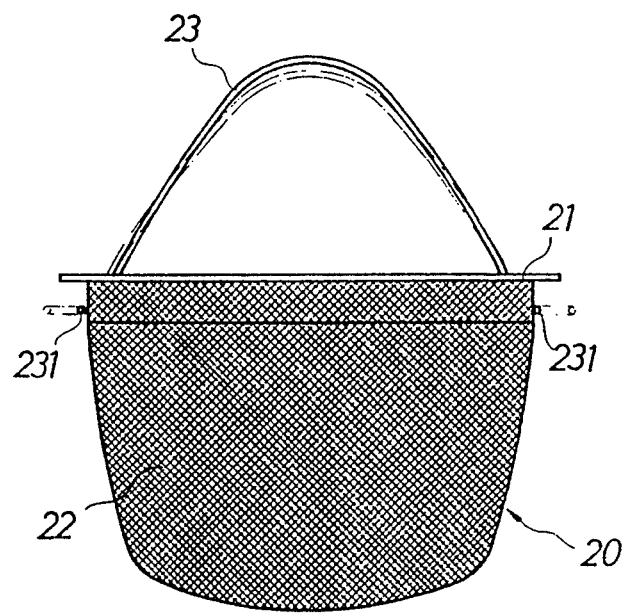
FIG. 2 illustrates a side elevational view showing a compressed spring and a filter cup.
Figure 3:
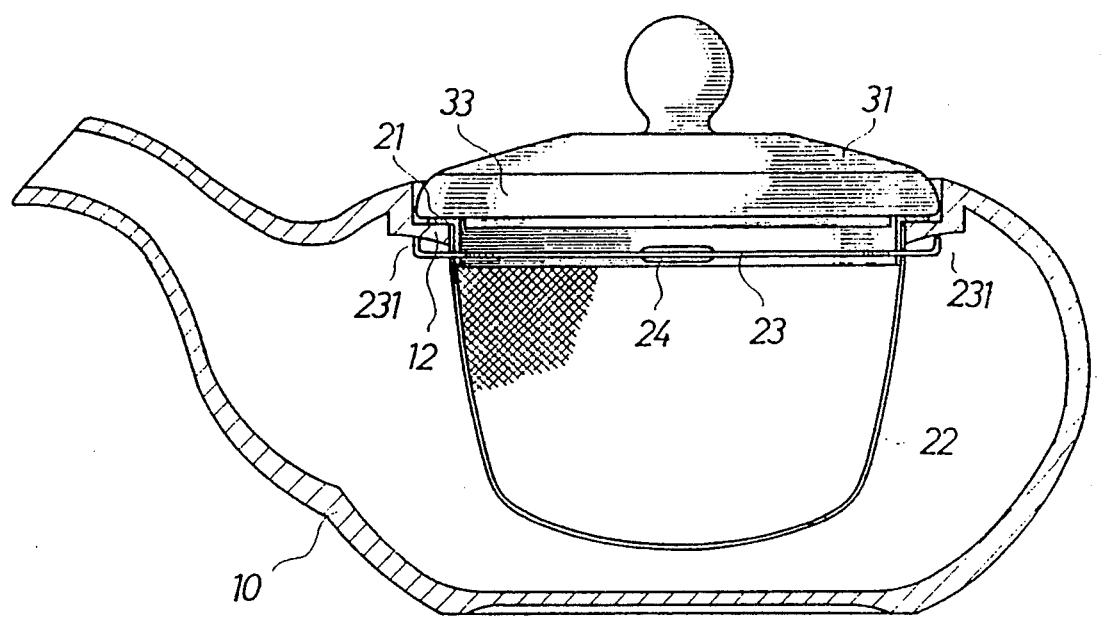
FIG. 3 is a sectional elevational view of the assembled teapot structure.

In use, the filter cup (20) is placed on the bearing ring (12) around the inside rim of the top mouth (11) of the pot (10) by gently squeezing the bar spring (23) above the rim (21) of the filter cup (20) with the fingers so as to push the outwardly protruding parts (231) inwardly until they engage against the outside of the cup rim (21) as shown in FIG. 2. Then the bar spring (23) is released so that the two end parts (231) expand outwardly to their original position as shown in FIG. 3, where they engage beneath the bearing ring (12) to tightly hold the filter cup (2) in position. A user can make tea by following the process as indicated below: first turn the parts (231) of the bar spring until the top of the spring is inserted into the slot (24) in the cup rim (21) causing the ends of the spring to grip the undersurface of flange (12) and the complete mouth of the filter cup is exposed for receiving tea leaves and boiling water. Then, the lid (30) is placed on the cup rim (21) of the filter cup (20) on the bearing ring (12). As the filter cup (20) is made of magnetic metal, it is tightly adhered to the lid (30) with the embedded magnetic ring (332). Thus the lid (30) is tightly adhered to the top mouth of the pot (10) and since the tea leaves are confined within the filter cup, only pure tea can pass through the spout into a tea cup.

Figure 4:
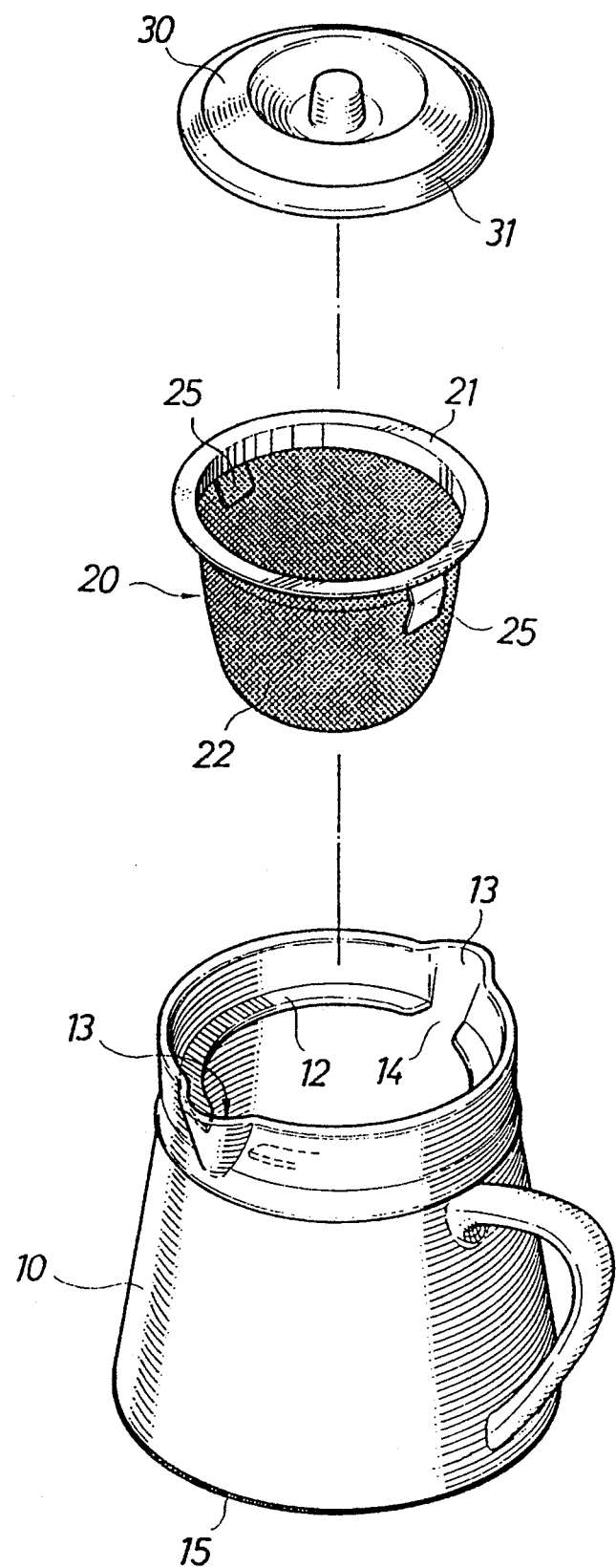
FIG. 4 is an exploded perspective view showing a second embodiment of the invention.
Figure 5A:
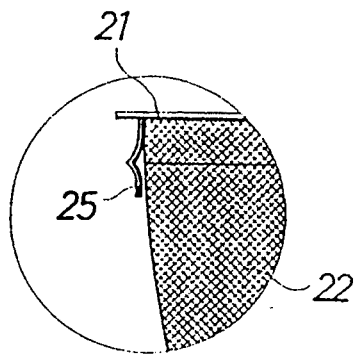
FIGS. 5A to 5C are partial elevational views showing spring arrangements for the filter cup.
Figure 5B:
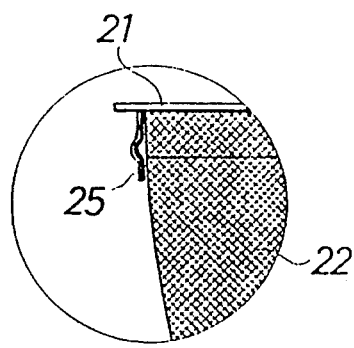
Figure 5C:
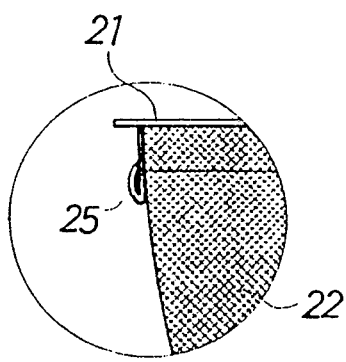

An alternative design of pot (10) and filter cup (20) is shown in FIG. 4, in which two outlets (13) are arranged at a spacing of 180° around the top mouth of the pot (10), and the bearing ring (12) has two openings aligned with the outlets (14). A felt or like pad (15) is adhered to the bottom of the pot (10). Between the rim 21 of the filter cup (20) and the filter (22) are two oppositely positioned leaf springs (25), bent outwardly with the distance between the two bent ends being somewhat larger than the inside diameter of the bearing ring (12) of the pot (10) and there is no spring (23) nor slot (24) as in the previous embodiment. The leaf springs (25) may take different forms as indicated in FIGS. 5A to 5C.

Figure 6:
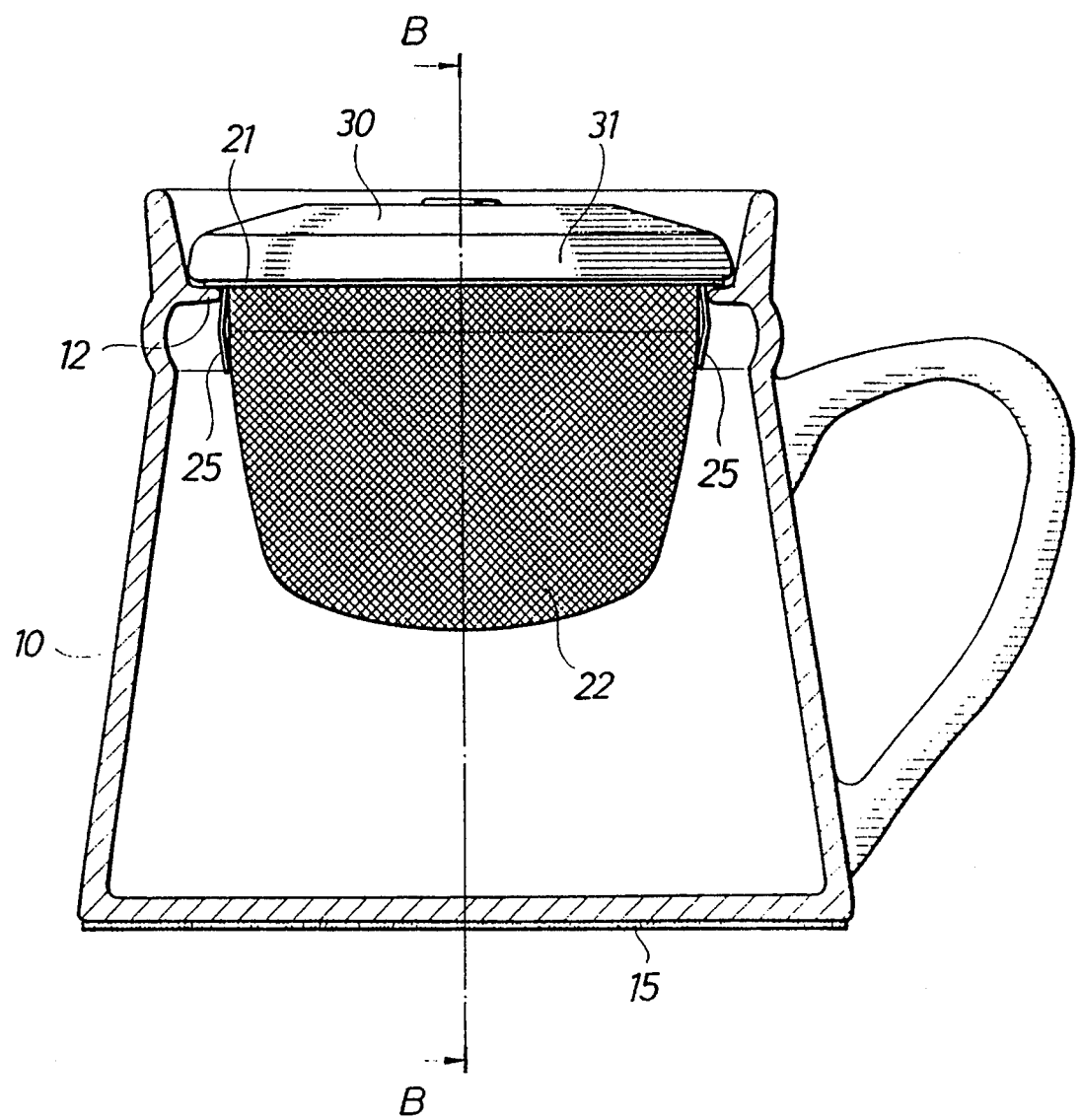
FIG. 6 is a longitudinal sectional view of the second embodiment of the invention along line A—A shown in FIG. 7.
Figure 7:
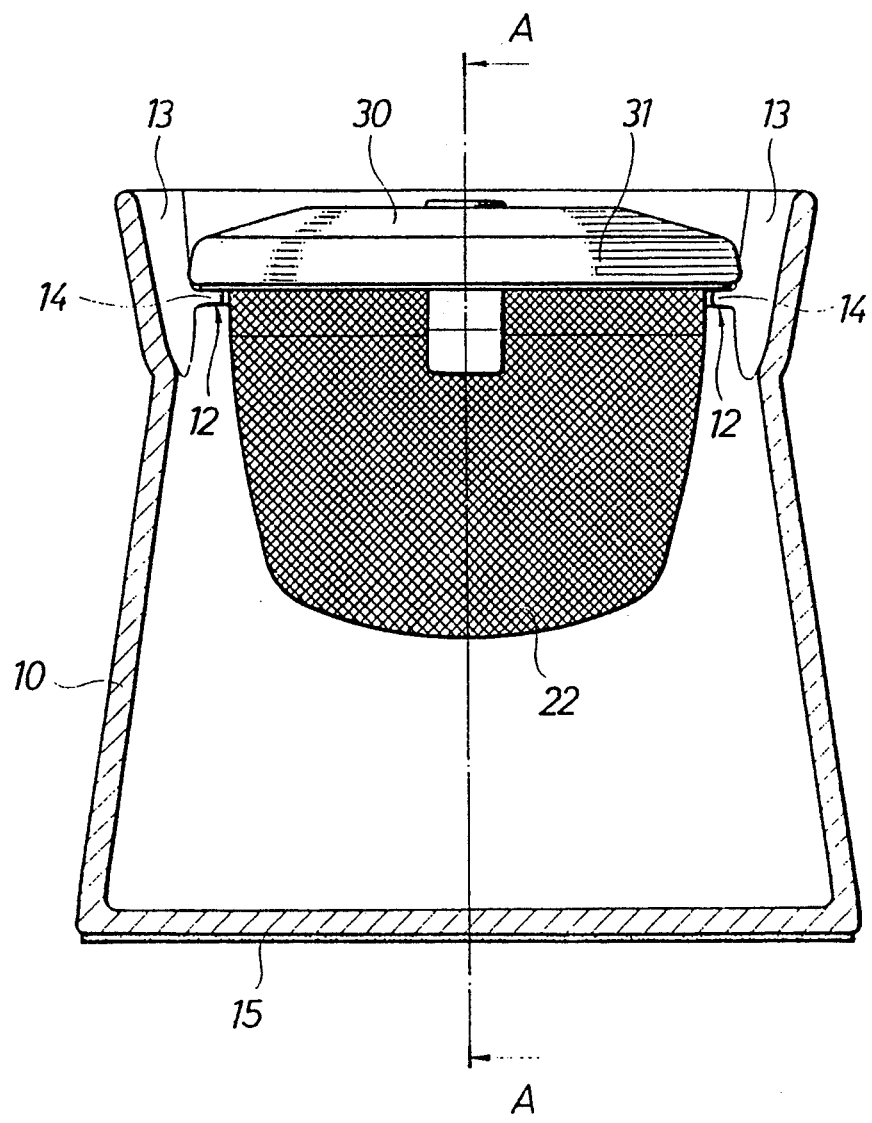
FIG. 7 is a longitudinal sectional view of the second embodiment of the invention along line B—B shown in FIG. 6.

Referring to FIG. 6 and FIG. 7, in which assembly of the parts of the FIG. 4 embodiments are indicated, when the filter cup (20) is held by the bearing ring (12) of the pot (10) after receiving a slight force downwardly applied to the top of the filter cup (20), the two springs (25) are inwardly compressed under the pressure of the applied force, and when the rim (21) of the filter cup (20) contacts the bearing ring (12), the springs (25) have passed under the bearing ring (12) and thus they are free to extend outwardly to their original shape with the distance between the two bent ends a little larger than the diameter of the bearing ring (12) of the pot (10). Thus the filter cup (20) is tightly held by the bearing ring (12), the entire mouth of the filter cup is exposed to receive tea leaves and water without any obstruction of a bar spring (23) and the filter cup (20) can be easily taken off the bearing ring (12). Furthermore, with the pot having its parts assembled as indicated in FIG. 7, there are two passages oppositely disposed at the top mouth of the pot (10) (formed by the openings (14) and the guide outlets (13)) outside the filter cup (20), either of which can allow the prepared tea to be poured into a cup or a user's mouth without having the filter cup (20) or the lid (30) taken off; such that the device can serve as either a teapot or a tea cup. The pad (15) adhered to the bottom of the pot (10) can protect the surface of a table top from being scratched after the teapot is repeatedly taken up and placed down on the table; also, the pad (15) is helpful for the stability of the positioned teapot on a table and in a car especially when it is adhered to some surface covered with adhesive fastener tape.

Figure 8:
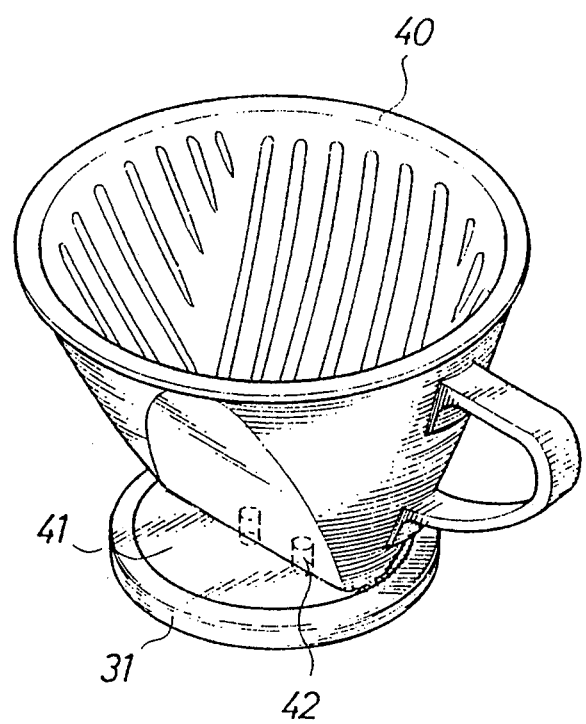
FIG. 8 is a perspective view showing a design of a cup for making coffee.

Importantly, the invention can be widely applied to any piece of a tea service and also a coffee maker as indicated in FIG. 8, in which the structure of the previous embodiments, namely the pot (10) and the filter cup (20) combines with a funnel-shaped cup (40) having a bottom rim (41) holding a lid ring 31 in which is embedded a magnetic ring as in FIG. 1A. A through hole (42) at the center of the cup bottom allows the cup (40) to be adhered to the top of the rim (21) of the filter cup (20) on the bearing ring (12) inside the pot mouth (11), and allows the funnel-shaped cup to be a coffee maker when a sheet of paper filter covers the cup bottom to hold the coffee dregs after liquid coffee is filtered and drops into the pot (10) through the hole (42).

In addition, as all the parts of the invention, such as the lid body (31) of the teapot lid (30), the spring (32) and the lid ring (33), and the filter cup (20) and the pot (10), are all connected by attachments or pressings, the teapot is safe to use without any problems of penetrating toxic substance from adhesives or the like.

I claim:

1. A beverage vessel comprising a pot, a filter cup and a lid, the pot having at least one outlet spout, a top mouth and an internally flanged rim around the top mouth, the filter cup adapted to fit in the pot, the filter cup having an outwardly flanged magnetic rim to fit on said internally flanged rim of the pot and securement means for holding the rim of the cup in engagement with the rim of the pot, the lid having an outer ring with embedded magnet means to fit on the rim of the filter cup and be magnetically held in engagement therewith.

2. A vessel as claimed in claim 1 wherein said lid has a circular inner portion and attachment means between the inner portion and said outer ring.

3. A vessel as claimed in claim 2 wherein the attachment means comprising a part circular spring clip fitting in aligned peripheral annular grooves in said inner portion and said outer ring.

4. A vessel as claimed in claim 1 wherein said filter cup includes a pivotal arch-shaped handle spring with opposite ends projecting through diametrically opposed openings formed in an upper rim portion of the filter cup, and wherein the securement means comprises projecting cranked ends of the handle spring adapted to engage under the rim of the pot when the handle spring is pivoted into a position parallel with the rim of the filter cup.

5. A vessel as claimed in claim 4 wherein said rim portion of the filter cup includes a slot for receiving a top part of the handle spring in said position of the handle spring.

6. A vessel as claimed in claim 1 wherein said securement means comprises spaced leaf springs extending downwardly from the rim of the filter cup to frictionally engage within said rim of the pot.

7. A vessel as claimed in claim 1 wherein the pot has a pair of diametrically opposed spouts formed in the top mouth of the pot and openings in the rim of the pot aligned with the spouts.

8. A vessel as claimed in claim 1 wherein the lid is combined with a coffee-making cup assembly to fit atop the pot and supply same with filtered coffee.

* * * * *